April 20, 1943.  C. R. PATON  2,317,216
MOTOR VEHICLE POWER TRANSMISSION CONTROL
Filed June 23, 1941  4 Sheets-Sheet 1

Fig. 1.

INVENTOR.
Clyde R. Paton
BY
Sibbitts & Hart
Attorneys

April 20, 1943.    C. R. PATON    2,317,216
MOTOR VEHICLE POWER TRANSMISSION CONTROL
Filed June 23, 1941    4 Sheets-Sheet 3

INVENTOR.
Clyde R. Paton
BY Sibbetts & Hart
Attorneys

April 20, 1943.  C. R. PATON  2,317,216
MOTOR VEHICLE POWER TRANSMISSION CONTROL
Filed June 23, 1941  4 Sheets-Sheet 4

INVENTOR.
Clyde R. Paton
BY Tibbetts & Hart
Attorneys

Patented Apr. 20, 1943

2,317,216

UNITED STATES PATENT OFFICE 2,317,216

MOTOR VEHICLE POWER TRANSMISSION CONTROL

Clyde R. Paton, Birmingham, Mich., assignor to Packard Motor Car Company, Detroit, Mich., a corporation of Michigan Application June 23, 1941, Serial No. 399,407

20 Claims. (Cl. 192—.01)

This invention relates to control mechanism for clutches employed in motor vehicle drive mechanism between the source of power and the change speed gearing.

Motor vehicle drive mechanism usually includes an engine, change speed gearing shiftable manually or automatically and a clutch between the engine and the change speed gearing. The clutch is normally engaged in driving relation but must be disengaged when there is a change to be made in the change speed gearing ratio. The change in the drive through the change speed gearing has been accomplished by manually or automatically operable mechanism. The clutch has been disengaged by manually operable mechanism and/or by power mechanism under the control of a governor and the accelerator pedal.

The average driver has no difficulty in manually controlling the clutch for different driving conditions, but difficulty has been encountered in obtaining smooth clutch operation with automatic control mechanism because of the variable engagement rates required by different driving conditions.

It is an object of this invention to provide automatic clutch control mechanism for vehicle drive mechanism that will engage the clutch to suit the several different driving conditions encountered.

Another object of the invention is to provide a vacuum-electric mechanism that will control the operation of a motor vehicle drive mechanism clutch in the same manner as normally accomplished by the driver in actuating a pedal.

Another object of the invention is to provide automatic mechanism for engaging and disengaging motor vehicle clutch mechanism smoothly and quickly without manual operation of the usual pedal.

Another object of the invention is to provide a vacuum-electric clutch operating mechanism under control of the motor vehicle accelerator pedal with valve means that will function to delay clutch engagement when starting or after gear shifting when the accelerator pedal is depressed to full open throttle position.

A further object of the invention is to provide a unitary control structure for vacuum-electric vehicle clutch operating mechanism that can be attached to and detached from the vehicle and controlled elements without disturbing adjustments.

Another object of the invention is to provide a power operated clutch control mechanism that will properly synchronize with the throttle actuating mechanism operation to disengage the clutch below a predetermined low range speed so that the clutch will freewheel and thereby eliminate any tendency to cause lurching in the drive.

Another object of the invention is to provide a clutch power control mechanism in which the normal rate at which the clutch is allowed to engage is retarded above a governed speed when the change speed gearing is in second speed forward drive so that there can be no negative lurch in the drive mechanism.

Still another object of the invention is to provide power control mechanism for a clutch that utilizes engine vacuum to prevent clutch slippage when in high gear with a small throttle opening.

Other objects of the invention will appear from the following description taken in connection with the drawings, which form a part of this specification, and in which.

The invention is shown applied to drive mechanism for a conventional motor vehicle. The instrument panel 10 and the dash 11 are the only vehicle parts illustrated other than the drive mechanism and control.

The drive mechanism, except for the clutch actuating and control mechanism, is conventional and includes an internal combustion engine 12, disk plate clutch 13, change speed gearing contained in housing 14 and driven shaft 15 from which power is transmitted to the driven road wheels. One type of change speed gearing that can be employed is shown in Patent No. 2,193,230, issued March 12, 1940. The driven clutch plate is normally engaged by a plurality of springs 16 and is disengaged through operation of a pivoted rock lever 17 shifting a throw-out collar 16' that actuates arms 18' anchored to pressure plate 14' and a cover 15' fixed to the flywheel within clutch casing 18.

The clutch lever 17 can be operated by foot mechanism or by automatic power mechanism. Such mechanisms act upon a U-shaped actuator 19 having an arm pivotally mounted on a pin 19' carried by a boss 20 extending from the side of the clutch housing and the other arm pivoted on a pin 17' fixed to the vehicle frame (not shown). Link 21 connects the inner arm of the actuator with the throw-out lever. A pedal 22 is suitably pivoted to the motor vehicle at 23 and is connected by link 24 to the outside arm of the actuator, a suitable bolt or pin 25 extending through the actuator 19 and slot 26 in the link 24 to provide such connection. This slot allows the actuator to be rocked by automatic power means without moving the clutch pedal. Spring 27 is connected to the pedal and the pin 17' to hold the clutch pedal up during power actuation of the clutch mechanism.

Figure 1:
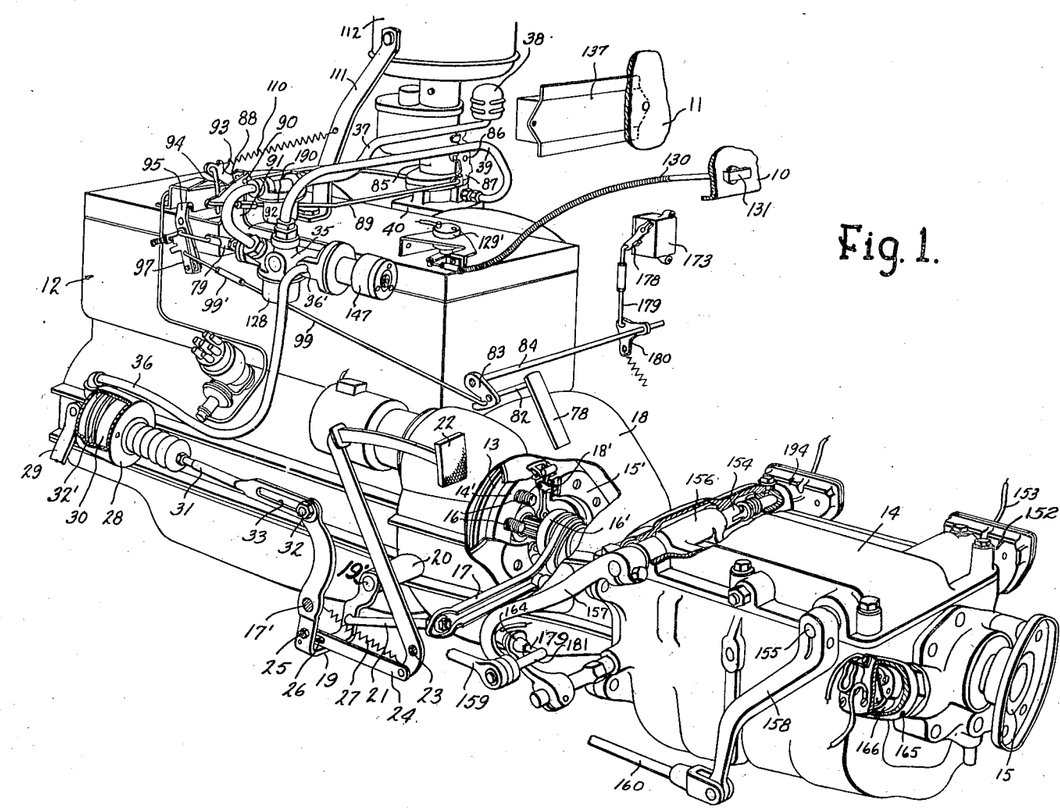
Fig. 1 is a perspective view of the power plant of a motor vehicle incorporating the invention.
Figure 2:
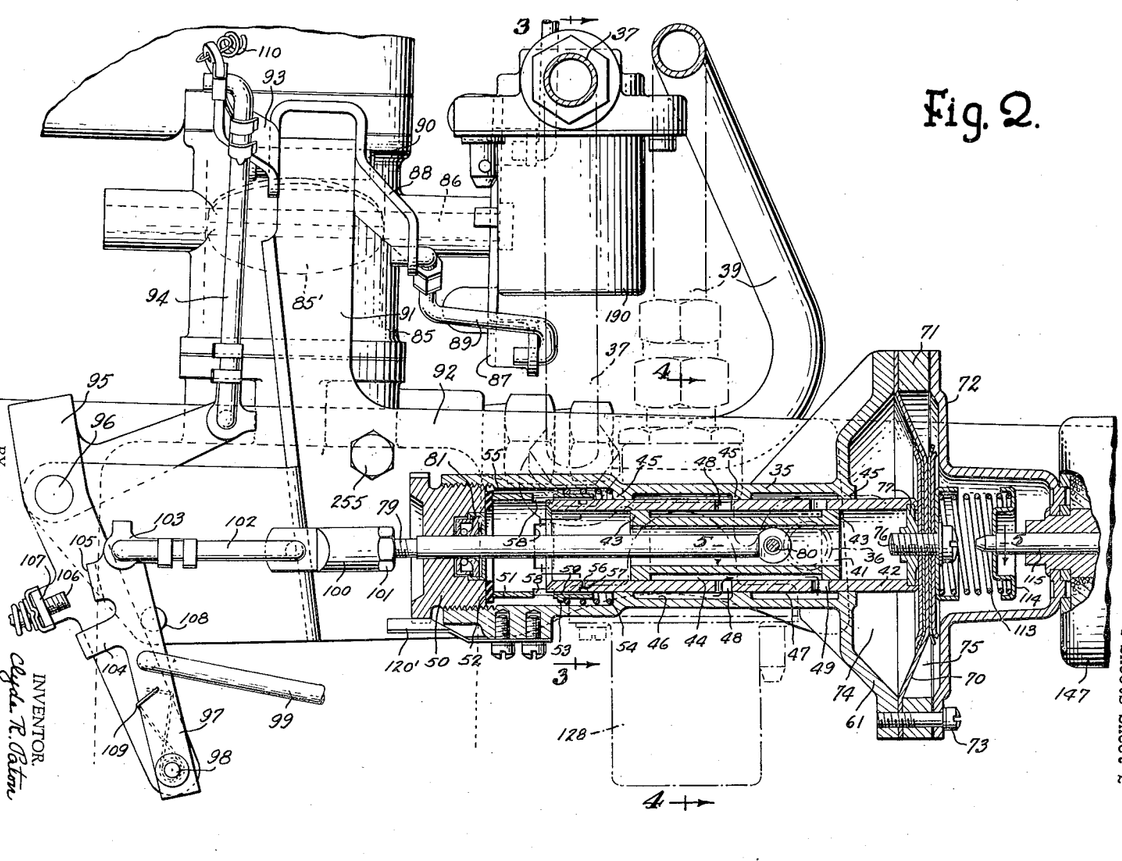
Fig. 2 is a sectional view of the control mechanism, the main pressure control valve being in section and other elements being broken away or dotted in to show their general relationship, taken on line 2—2 of Fig. 3.

The clutch actuator can also be automatically operated by power means. A power cylinder 28 is suitably anchored to a bracket 29 fixed on the vehicle and contains a piston 30 having a rod 31 pivotally connected by bolt 32 to the upper end of the outside arm of actuator 19. The bolt rides in a slot 33 to allow operation of the pedal without causing actuation of the piston rod. Spring 32' in the cylinder normally urges the piston toward the rear of the vehicle, or to the right as viewed in Fig. 2, so that the clutch will engage.

Clutch operation is automatically obtained by a vacuum-electric actuated mechanism. Atmospheric or subatmospheric pressure in the power cylinder, for actuating the piston and its rod, is regulated by a compound master valve device housed in casing 35. A power line, in the form of a conduit 36 connects the outlet port 36' in the valve casing with the forward end of the power cylinder. The valve casing is connected with atmosphere by conduit 37 and the inlet end of such conduit has an air cleaner 38 attached thereto. The valve casing is connected with a source of sub-atmospheric pressure, or vacuum, by conduit 39 connected with the intake manifold 40 of the engine.

Within the valve casing is arranged a compound valve consisting of elements in the form of a piston 41 and a sleeve 42 actuated to cooperate in controlling the pressure in the power cylinder for automatically accomplishing every clutch operation heretofore performed by the driver of a motor vehicle. The piston valve element is in the form of a hollow spool and is arranged in the sleeve valve element with the annular end flanges 43 contacting the sleeve element as bearings and thereby forming the ends of a chamber 44. The valve casing is formed with three inwardly extending annular flanges 45 serving as bearings for the valve sleeve element and they form the ends of chambers 46 and 47. The vacuum inlet conduit 39 communicates with chamber 46 and the power line 36 communicates with chamber 47. The valve sleeve element has a series of ports 48 therethrough connecting chambers 44 and 46 and also has a series of ports 49 connecting chambers 44 and 47 when the spool valve is in the rearward position. It will thus be seen that with the valve in the position shown in Fig. 2 the power cylinder is connected with vacuum in the intake manifold through conduit 36, chamber 47, ports 49, chamber 44, ports 48, chamber 46 and conduit 39.

The forward end of the valve casing is connected with atmosphere through conduit 37 and contains mechanism controlling the rate or bleed of air into the casing. This end of the casing is closed by a threaded plug 50 screwed therein. An air control or choke sleeve 51 is arranged in this end of the casing and is seated against a gasket 52 bearing against the inner end of the screw plug. The sleeve has an annular boss 53 and a coil spring 54 bears at one end against this boss and at the other end against the forward flange 45 of the valve casing. The spring holds the forward end of the sleeve in sealed engagement with the gasket, and between the sleeve and the casing is a chamber 55 with which the air conduit 37 communicates. The valve sleeve element is slidably mounted in this choke sleeve and has a relatively small bleed hole 56 drilled therethrough which opens into an annular peripheral groove 57. The choke sleeve has ports or windows 58 formed therein and axially extending grooves 59 are formed in the interior wall of the sleeve, from the windows to the rear end, so that they can overlap the annular groove in the sleeve valve element. The sleeve valve element can be moved to open or close the windows and when the windows are open air can pass therethrough from chamber 55 that is open to conduit 37, and when the windows are closed air can pass from chamber 55 through grooves 59 to groove 57 and through bleed hole 56. Air passing through the windows or the bleed hole enters the interior of the valve piston element and can flow to chamber 47 when ports 49 are uncovered by forward movement of the valve piston element.

There is another path through which air can bleed into chamber 47 when solenoid 128 is de-energized, and the piston valve is in a rearward position. A passage 60 is formed in the valve casing and it extends from the air inlet boss 60' through the bell shaped rear end wall 61. Another passage 62 in the casing extends from chamber 63, in communication with chamber 46, through the end wall 61. Passage 62 is considerably smaller in diameter than passage 60 and is further restricted adjacent chamber 63.

When the fuel intake manifold of the engine is in open communication with the power cylinder, low pressure or vacuum moves the piston forwardly to disengage the clutch. When this low pressure source is shut off and air is admitted to the power cylinder the piston is moved to the rear of the cylinder allowing the clutch to engage. The rate of clutch engagement is controlled entirely by the rate of air bleed into the power cylinder and so long as there is sufficient manifold vacuum to hold the power piston in clutch disengaging relation, variations in inlet manifold vacuum, due to engine operating conditions, will not affect the operation of the device.

The master control valve device regulates the rate of air bleed to provide the desired clutch engagement action as well as the proper engine speed synchronization. The piston valve element of this device is connected through compound linkage to the accelerator pedal and the valve sleeve element of such device is actuated by a spring loaded pressure responsive diaphragm 70 which is subjected to a pressure equal to that in the power cylinder. As the accelerator is depressed and vacuum in the power cylinder is decreased, the two valve elements move in relation to each other to automatically provide the proper rate of clutch engagement for all normal operating conditions. The diaphragm 70 is clamped to the rear end of the valve casing by a ring member 71 and a cap 72 fits against the ring member. The ring member and cap are secured to the casing by bolts 73. The casing end and the cap define an enclosed space divided by the diaphragm to form chambers 74 and 75. Bolt 76 secures the central portion of the diaphragm to a cap 77 fixed to and sealing the rear end of the valve sleeve member 42.

The compound linkage between the piston valve element 41 and the accelerator pedal 78 includes a rod 79 that is pivotally secured to the piston valve element by pin 80 and extends through an axial opening in the screw plug 50. A ring seal 81, formed of leather treated with oil, encircles the rod and is seated in a recess in the end of the screw plug so that there will be no leakage between the plug and rod structure. The pedal leg 82 is connected to an arm 83 fixed on a rotatable cross-shaft 84, suitably mounted on the vehicle. The carburetor 85 has the usual throttle valve 85' mounted on shaft 86 and fixed to this shaft is an actuator arm 87. This arm is connected to another arm 88 by an adjustable link 89. Arm 88 is fixed to shaft 90 mounted on an upwardly extending ear 91 of bracket 92, and another arm 93 is fixed to this shaft 90. Link 94 connects arm 93 with a bell crank lever 95 pivoted at 96 to the forward end of bracket 92. Lever 97 is mounted on pin 98 on the bell crank lever and is connected with arm 83 by a link rod 99 which may be formed of sections associated in an axially adjustable relation. The piston valve element actuating rod 79 forms a part of the connection between the piston valve element and lever 97. The end of rod 79 outside of the plug is threaded and screws into a clevis 100 where it is held in desired adjusted relation by nut 101. A link 102 connects the clevis and the upper end of the lever 97 and is retained with the lever by a metal clip 103. By adjusting the position of the rod 79 relative to the clevis 100, the distance the valve piston travels before opening ports 49 in the valve sleeve can be regulated. If the rod is screwed too far out of the clevis, excessive free play in the accelerator pedal will result. If the rod is screwed too far into the clevis, the ports 49 in the valve sleeve will be opened when they should be closed and the clutch will not release properly because the full manifold vacuum cannot be had in the power cylinder. Rod adjustment in the clevis is to be made only when it is desired to modify the free play of the accelerator pedal, or to change the relation between throttle opening and clutch engagement.

There can be lost motion between the bell crank lever 95 and lever 97 as they are pivoted together at 98. Lever 97 is formed with a flanged arm 104 overlying the forward edge of the lower arm of bell crank 95 to limit rearward movement of the lever relative to the bell crank. The lever 97 has another flanged arm 105 on its forward portion adapted to abut a screw 106 adjustably carried by a flange 107 on the forward edge of the lower bell crank arm. These two flanged arms function to limit the fore and aft relative movement, that is they limit the lost motion of the bell crank lever 95 and lever 97. There is a stop pin 108 on bracket 92 limiting the rearward movement of the lower arm of the bell crank lever. The lower arm of the bell crank 95 and the lever 97 have a spring 109 engaging opposite edge portions thereof, that is anchored on pivot 98, and exerts pressure to normally urge the flange arm 104 of the lever against the bell crank. A coil spring 110 is fixed at one end to bracket 111 bracing the carburetor air cleaner 112 and is secured at the other end to arm 93, such spring serving to normally shift the throttle valve mechanism to throttle valve idling position.

Figures 3, 4, 5:
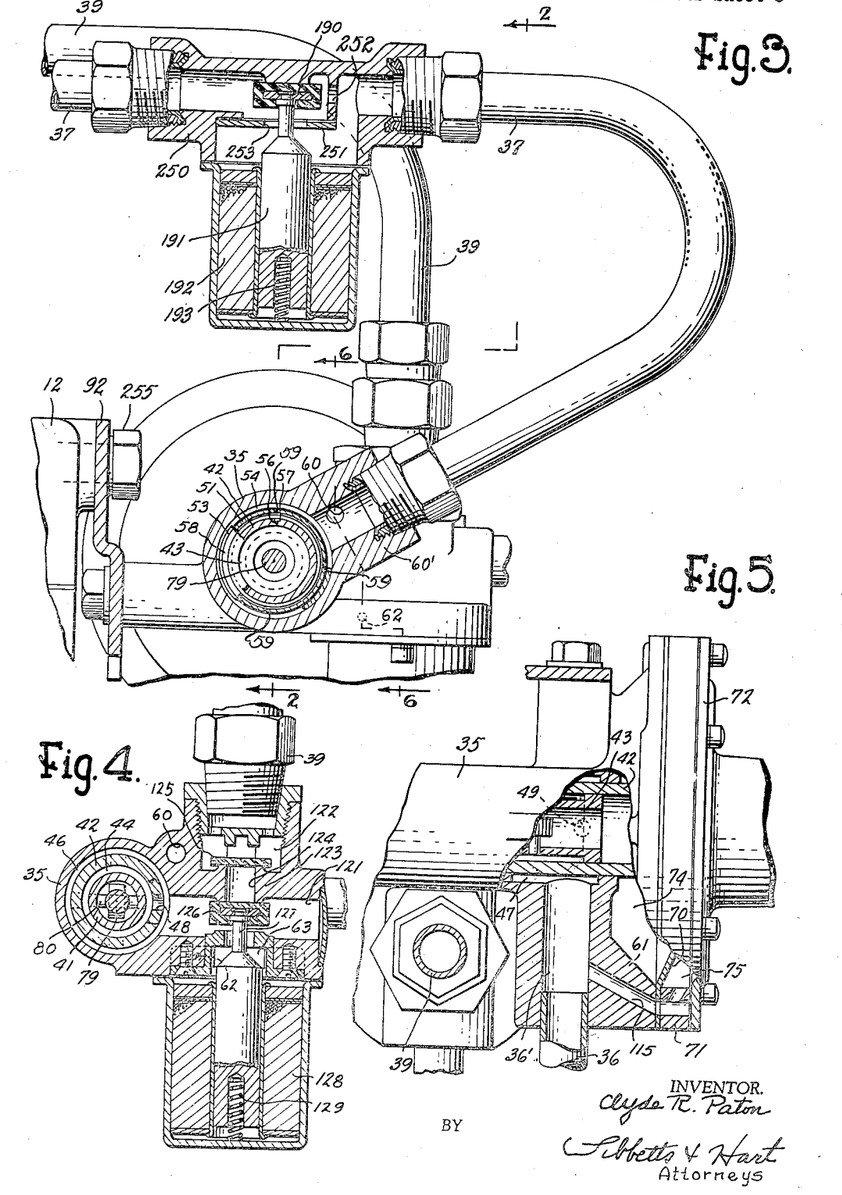
Fig. 3 is a sectional view of the control valve for the air line taken on line 3—3 of Fig. 2.
Fig. 4 is a sectional view of the control valve for the vacuum line taken on line 4—4 of Fig. 2.
Fig. 5 is a plan view of one end of the main control valve structure, parts being in section to show passages to a diaphragm control and to the power line.
Figure 6:
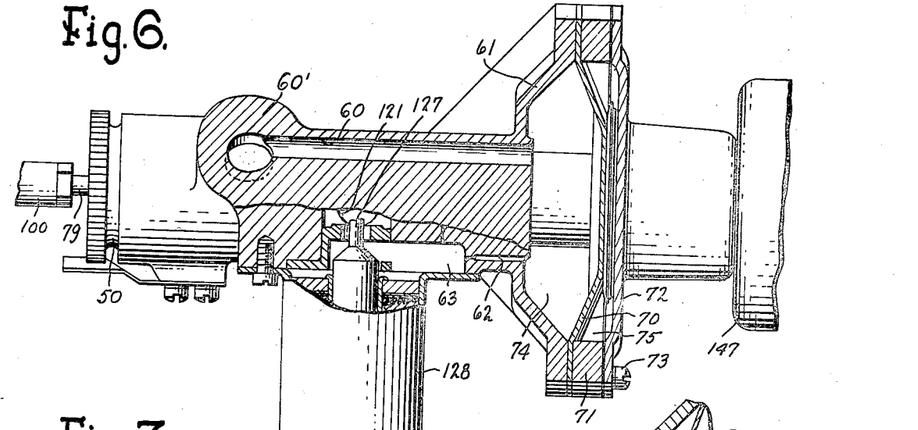
Fig. 6 is a sectional view of the main valve body to show internal pressure passages and the air line control valve taken on line 6—6 of Fig. 3.
Figure 7:
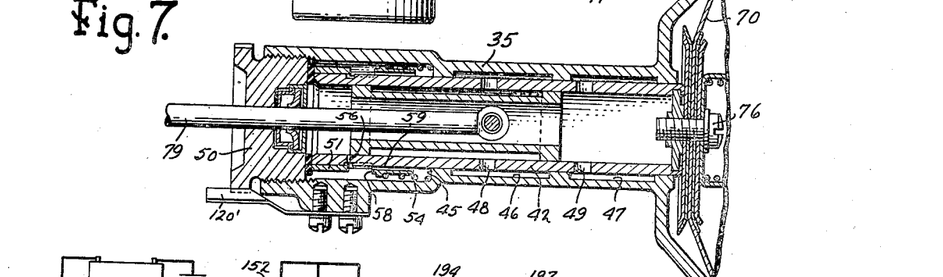
Fig. 7 is a sectional view of the main control valve shown in Fig. 2, shown in a different position of operation.

The diaphragm 70 is acted upon by a coil spring 113 in chamber 75 and such spring is loaded through means of the cup member 114 engaged by stem 115. The valve casing end wall 61, diaphragm 70 and spacer 71 are ported, see Fig. 5, to provide an open passage 115 that establishes communication between the power line 36 and chamber 75. Such passage thus insures the same pressure condition in the diaphragm chamber 75 as exists in the power cylinder 28. The spring loaded vacuum diaphragm 70, to which the valve sleeve is attached, forms the heart of the clutch operating device. The rear side of the diaphragm is subjected to pressure equal to that in the power cylinder and the valve piston is connected with and actuated by the throttle mechanism. Any movement of the piston valve is thus by manual effort and movement of the valve sleeve is entirely automatic and controlled solely by change of pressure in the power cylinder.

Assuming that the engine is idling with the transmission gearing in neutral and it is desired to make a part-throttle start in second gear, the operator may forget the clutch pedal entirely, shift the transmission gearing into second speed, and depress the accelerator pedal. The first movement of the accelerator pedal will pull the valve piston 41 forwardly, from the position shown in Fig. 2, inside of the valve sleeve closing ports 49 to shut off vacuum from chamber 44 to chamber 47 and the power cylinder, and opening ports 49 to atmosphere through the interior of the valve sleeve and piston. The initial movement of the valve piston takes place ahead of movement of the valve sleeve because ports 49 must be opened to atmospheric pressure before the diaphragm is affected to move the valve sleeve. Upon the increase of pressure in chamber 75, due to opening of ports 49 to atmosphere, the diaphragm moves the valve sleeve forwardly with the valve piston but lagging slightly behind the valve piston in their travel, thus a balanced condition results between the power cylinder pull and the clutch spring load at the initial clutch plate contact position which is termed the "cushion point" of the clutch engaging movement. In this connection the clutch engaging process can be segregated into three distinct phases, the first portion of the process comprising moving the clutch driven member from fully released position until it just contacts the driving member; the second portion of the process comprising engaging the driven clutch member with the driving clutch members sufficiently to provide the balanced condition called the "cushion range" which ends when the car speed and engine speed are synchronized, and the third portion of the process comprises completing full engagement of the driven clutch member with the driving clutch member. In the first phase of the process, the accelerator pedal is depressed and the valve piston is moved forward until the throttle linkage starts to open the throttle valve. In the second phase of the process, the valve sleeve moves forward, an amount dependent on the throttle opening, to obtain the proper rate of clutch engagement. In the third phase of the process, air continues to enter the power cylinder through ports 49 in the valve sleeve until full engagement of the clutch members is effected.

The compound linkage for operating the throttle and the valve piston is necessary to provide adjustment for synchronizing the engine speed and the clutch engagement process. The position of adjustable stop screw 106 fixes the engine speed at which the clutch engagement starts to take place. Changing the screw adjustment to increase the gap in which the lever 97 can pivot relative to the bell crank, permits the clutch control rod to be moved farther forward before the carburetor throttle valve starts to open, thus reducing the engine speed at which the clutch engages. Adjusting the screw to decrease the gap, increases the engine speed at the time of clutch engagement because the carburetor throttle valve has started to open before the valve piston rod has moved very far. Thus, the farther the piston valve rod is moved forward before the throttle valve is actuated, the slower the engine speed will be at the time of clutch engagement. Spring 109 serves the purpose of moving the lever 97 to the right ahead of bell crank lever 95 in its movement toward the right, as viewed in Fig. 2, under the action of spring 110 when the accelerator pedal is released. Thus the valve piston is acted upon immediately upon release of the pedal to open up vacuum to the power cylinder so that the clutch will be entirely disengaged quickly. This is of particular advantage at low vehicle speed operation, because if the clutch is not entirely disengaged a lurching drive will result.

The screw plug 50 regulates the distance the valve sleeve moves forward before it abuts gasket 52 against which the end of the choke sleeve 51 is sealed. The timing of sealing off of air passage through windows 58 so that air must bleed through orifice 56 can thus be regulated. As soon as the windows are closed air admission to the power cylinder is cut off through this source and the balance of the clutch engagement is then accomplished by the bleed of air through the small orifice 56 so the rate at which air enters the power cylinder is greatly reduced. The effect is to trap some vacuum in the clutch cylinder momentarily, that is just long enough to slow up the final clutch engagement. When the forward movement of the valve piston ceases, the similar movement of the valve sleeve also stops, leaving the ports open just far enough to maintain proper balance for smooth clutch engagement. The choke sleeve thus regulates the rate of clutch engagement. The adjustable screw plug regulates the timing of clutch engagement with the throttle valve functioning. When the plug is screwed into the valve body, the bleed is brought into operation at an earlier time in the clutch engagement cycle and will reduce any tendency for the clutch to grab or will increase any tendency of the clutch to slip. If clutch slip is excessive when making a standing start with wide open throttle, the plug must be screwed outwardly to reduce the slip. If the clutch grabs excessively when making a standing start with wide open throttle, the plug must be screwed in farther to reduce the grab. By means of such plug adjustment, the clutch can be regulated for most desirable operation for a standing start of the vehicle with a wide open throttle. The plug has a notched periphery in which a resilient locking member 120' can be engaged, such member being suitably fixed to the valve housing.

By altering the load on the diaphragm spring 113, the rate at which the valve sleeve will lag behind the valve piston in forward movement can be regulated. The spring load can be initially set by adjustment of stem 115 in some suitable manner and the spring load can be increased automatically for certain clutch shifting operations by a solenoid 147 acting upon the stem to move it forward from its normal position.

Automatic clutch operation can be discontinued at will by shutting off the vacuum conduit 39 from the valve casing. The valve casing is formed with two chambers 121 and 122, see Fig. 4, separated by wall 123 having a passage 124 therethrough. Chamber 121 is in open communication with chamber 46, and with chamber 63 when the valve is in its upper or de-energized position, and the vacuum conduit 39 is secured in open communication with chamber 122. At opposite ends of the passage 124 are arranged disk valves 125 and 126, valve 125 being of the one-way type and lifted by vacuum while valve 126 is fixed to an armature stem 127 extending through chamber 63 to a solenoid 128. This valve in its upper position shuts off communication between the vacuum passage 124 and chamber 121 and in its lower position shuts off the air inlet chamber 63 from chamber 121. The solenoid is suitably fixed to the valve casing. When valve 126 seals passage 124, air can bleed into chamber 46 from passages 62 and 60 that are in open communication with air conduit 37.

When the solenoid 128 is de-energized, spring 129 moves armature 127 to hold valve 126 against the wall 123 shutting off passage 124 and the vacuum connection to the intake manifold. When the solenoid is energized the valve 126 is moved to open the vacuum line to the intake manifold. The solenoid can be controlled by a lock-out switch 129' actuated by Bowden wire 130 leading to instrument board 10. The driver can operate the Bowden wire by means of a knob 131. When the knob is pulled away from the board it opens the switch and breaks the circuit to solenoid 128 and when pushed in, it closes the switch to establish the circuit to the solenoid.

Solenoid 128 forms a part of an electric system by means of which the vacuum shut-off valve device can be controlled. The electric source can be the motor vehicle battery 135 having a power line 136 leading to the engine starting motor 136' and to a relay having coils 138, 139, 140. In the power line, between the battery and the relay, is arranged the engine ignition switch 141 and the clutch lockout switch 129'. It will be seen that whenever either of these switches is open, the automatic operation of the clutch will cease and shifting must then occur through operation of the foot pedal, as solenoid 128 will be de-energized and the vacuum supply to the power cylinder will be cut off. The relay is housed in a casing 137 that is fixed to the dash 11.

The lock-out switch 129' can be opened by the Bowden wire 130 whenever the automatic clutch operation is not desired. This lock-out switch is useful when it is desired to use the engine as a brake when descending a grade in second gear as the shift into second gear can be made and the switch then opened. When the bottom of the grade is reached the Bowden wire is pushed to close switch 129' and the shift is made into high gear with automatic clutch shift.

When switch 129' is closed, coil 138 will be energized through grounded switches 164 or 165, thus moving normally open contact 143 into engagement with terminal 142. Terminal 143 is connected by conductor line 144 with the grounded solenoid 128, and as the contact 142 is directly connected with the power line 136 by line 145, current will flow to such solenoid and thus will open the valve 126 between the vacuum line 39 and the master control valve casing.

A slower rate of clutch engagement is required when starting in low gear or in reverse than when starting in second gear or in high gear. In order to obtain a second range of clutch engagement, solenoid 147 is fixed to the valve casing to control stem 115 and thereby increase the load on spring 113 when starting in low gear or reverse. When energized, this solenoid pushes the armature stem 115 forwardly from its normal adjustment, loading spring 113 and increasing the spring pressure against diaphragm 70, to thereby retard the rate of clutch engagement due to the reaction on the movement of the master valve sleeve. If a compromise diaphragm loading was utilized for starting in all forward and reverse drives, the clutch would have a tendency to slip in second and high, and to grab in low and reverse, but with the two spring loadings a better result is obtained under both circumstances.

Solenoid 147 is energized only when switches 129' and 141 are closed and when the transmission gearing is shifted into low gear or reverse for starting. This solenoid is grounded and is connected with relay terminal 148 by conductor line 149. A conductor line 150 is connected with the power line 136 and has a terminal 151 adapted to be shifted by relay coil 140 to engage and disengage terminal 148. Thus when switch 152 is closed, current flows from the power line, through relay coil 140 and line 153 to energize the coil and cause terminals 151 and 148 to contact and thereby energize solenoid 147 through lines 136, 150 and 149.

The driving relation of the transmission gearing in casing 14 is controlled by a pair of similar shafts 154 and 155, each carrying a gear shifter member as indicated at 156. The forward shaft 154 is rocked by an arm 157 fixed at one end thereof and the rear shaft 155 is rocked by arm 158. Suitable linkage 159 and 160 extends from the arms to be actuated by the driver in the usual manner. When the shifter member on the forward shaft is rocked clockwise, the gearing is engaged for third or high speed forward drive and when rocked counterclockwise, the gearing is engaged for second speed forward. When the shaft 155 is rocked clockwise, the gearing is engaged for first speed forward drive and when rocked counterclockwise, the gearing is engaged for reverse drive. Switch 152 has two contacts 161 and 162 adapted to be engaged by a grounded arm 163 on the shaft 155 so that when either first speed forward or reverse drive is engaged the switch will be closed to thus cause solenoid 147 to be energized and delay the clutch engagement by loading the diaphragm as previously explained. When the switch is open, as it is in high gear, second gear and neutral, the solenoid 147 is deenergized as the coil 140 will be dead, separating terminals 151 and 148.

The clutch control system, thus far described, will rapidly disengage the clutch as soon as the foot is released from the accelerator pedal because the pressure in the power cylinder is immediately lowered by the admission of vacuum from the intake manifold. This immediate release is not always desirable, and a further control is added to restrain the disengagement action. For example, when driving in high gear, freewheeling drive would result if the clutch is released, every time the foot is taken from the accelerator pedal. Above a certain speed, such as about fifteen miles an hour, freewheeling in high gear is undesirable.

As previously related, coil 138 is grounded through switches 164 or 165 which are in parallel. Switch 165 is controlled by centrifugal governor weights 166, responsive to the speed of the tail shaft 15, and includes a pair of stationary contacts 167 and 168 and a movable grounded quick acting contact 169 operating between the stationary contacts in response to the position of the governor weights. Contact 169 is moved to engage contact 168 below some predetermined vehicle speed, such as fifteen miles per hour, and to engage contact 167 above such speed. Contact 168 is connected to terminal 170 from which conductor line 171 leads to contact 172 of an accelerator operated switch 173. This switch has a movable element 174 connected with coil 138 by conductor line 175. A conductor line 176 leads to direct speed switch 164 from line 175 and terminates in a contact 177 that engages grounded contact 180' except when the change speed gearing is in high speed drive. The movable contact 174 of switch 173 is actuated by an arm 178 connected by link 179 to arm 180 fixed on the accelerator pedal operated shaft 84. This arrangement is such that switch 173 is opened when the accelerator is depressed prior to throttle linkage motion, but when the pedal is fully released to engine idling position then the switch is closed.

It will be seen that with accelerator switch 173 closed the coil 138 will be active below the governed speed to energize the solenoid 128 and hold the vacuum passage open, and will be inactive above the governed speed to de-energize solenoid 128 so that valve 126 will be closed by spring 129 to shut off vacuum and prevent clutch disengagement.

With the governor making the automatic clutch shifting mechanism inoperative above the governed speed, it would be impossible to shift gears above the governed speed without some device to overrule the governor. The direct speed switch 164 is designed to overrule the governor in controlling the vacuum valve solenoid 128 as it is normally grounded and causes relay coil 138 to be active. The switch 164 is mounted on one side of the transmission casing and the grounded movable contact element 180' is carried by plunger 179' which is positioned to be moved, by an actuator 181 on arm 157 when shifted to high gear position, to break the normally closed contact. The switch is closed at all times except when there is high gear drive, and when closed, it completes a circuit around the governor switch energizing solenoid 128 and thus overruling or cancelling the effect of the governor. The switch 164 is adjusted so that the initial movement of the shift arm 157 out of high gear position closes the contact, thus permitting clutch disengagement by opening the vacuum valve 126 before any movement of the gear shift control shaft 154 takes place.

The function of the accelerator switch 173 is to prevent possible excessive clutch plate wear due to slippage when operating in high gear drive below the governed speed. When the accelerator switch contacts 174 and 172 are open, the circuit to solenoid 128 is open thus making the automatic control of the clutch inoperative. The contacts of switch 173 are set so that they are closed when the accelerator pedal is fully released. As the accelerator pedal is depressed, the contacts open when the slack in the linkage to the throttle has been taken out but before the throttle valve starts to open. The accelerator switch 173 is connected in parallel with the direct speed switch 164 so that the direct speed switch will overrule or cancel the effect of the accelerator switch in all but high gear drive.

With the vehicle being operated in second gear drive under widely varying throttle openings, an offensive lurch would result if the clutch were permitted to engage rapidly the instant the accelerator pedal is depressed. This lurch would result from torque reversal when the clutch was engaged before the engine speed had been brought up to vehicle speed. In order to overcome this lurching effect an air choke control device is provided which delays the clutch engagement until the engine speed is increased to correspond with vehicle speed, thus preventing torque reversal. To this end valve 190 is arranged in the air conduit 37 to restrict the rate of air bleed to the power cylinder to thus slow up the rate of clutch engagement. This valve 190 operates in a coupling 250 (see Fig. 3) in the air conduit and is attached to an armature 191 controlled by solenoid 192. The coupling has an internal wall 251 with a restricted opening 252 and an opening 253 adapted to be opened or closed by the valve.

This solenoid 192 is energized only during second speed drive above the governed speed when the valve 190 functions to close the opening 253. Under all other conditions the solenoid is de-energized and the atmospheric air bleed line is open through passage 253 because spring 193 normally urges the armature into valve opening position.

In order that the second speed valve operating solenoid will be energized only when driving in second gear above the governed speed, it is connected in series with a switch 194 arranged adjacent an end of shaft 154. This switch includes a movable contact 195 fixed to the end of shaft 154 and arranged to engage with a fixed grounded contact 196 when second speed has been established in the transmission. Conductor line 197 connects contact 195 with solenoid 192 and another conductor line 198 connects with the solenoid and with a relay terminal 199. When the relay coil 139 is energized, it will move terminal 199 into contact with a terminal 200 connected with the power line 145. The relay coil 139 is connected by conductor line 201 with terminal 167 of the governor switch 165 so the coil will not be energized until the governor switch is above the governed speed, whereupon contact 169 will move into engagement with contact 167.

Thus the second speed solenoid is energized and moves the valve 190 to restrict the air passage to conduit 37 only when the transmission is in second gear and the vehicle is travelling above the governed speed. The restriction to flow in the air line chokes the atmospheric bleed line to the clutch power cylinder and thereby slows up the rate of clutch engagement so that offensive lurch that would result from normal clutch engagement is eliminated.

It will be noted that the bracket 92 carries the master valve housing, a portion of the throttle actuating mechanism, solenoids 147 and 128, and the compound valve and actuator linkage therefor. Such structure can be assembled as a unit and attached to or detached from the engine as such. Stud bolts, indicated by the numeral 255, can be used to detachably secure the bracket to the engine and attachment with or detachment from the parts associated with the elements carried thereby can be readily made.

Figures 8, 9:
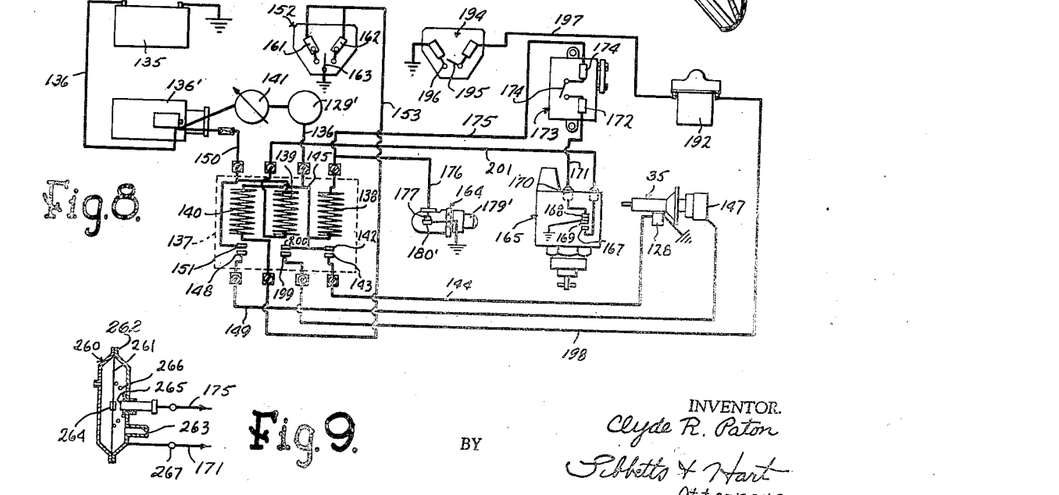
Fig. 8 is a diagram of the electric system employed in the control of the clutch operating mechanism.
Fig. 9 is a fragmentary view of the diagram shown in Fig. 8 with a vacuum controlled switch in place of the accelerator controlled switch.

In place of the accelerator operated switch 173, a vacuum operated switch 260, Fig. 9, can be employed. In this embodiment of the control mechanism there is a diaphragm 261 in a housing 262 having one side connected to the vacuum conduit 39 or with some other engine vacuum source by a tube 263. Contact 264 is fixed on the diaphragm and is urged away from insulated contact 265 by coil spring 266. Contact line 171 connects with terminal 267 and the diaphragm can be moved to make or break current flow between lines 171 and 175 depending upon vacuum. Vacuum will influence switch 260 substantially like the accelerator influences switch 173, thus while idling vacuum is high and the switch will be closed and as vacuum is decreased the spring 266 will open the switch. Thus below the governed speed and in high gear, the vacuum valve 126 will be closed and air will flow through passages 60 and 62 to engage the clutch and prevent possible excessive clutch plate wear due to slippage.

This mechanism automatically accomplishes every clutch operation normally performed by the driver with a foot actuated mechanism, thus relieving the driver of the necessity of using the foot clutch pedal. The driver uses the accelerator pedal and shifts gears in the usual way without touching the clutch pedal and all clutch engagements and disengagements are accomplished smoothly, quickly and automatically. Even when stopping, it is not necessary to touch the clutch foot pedal.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A pressure control mechanism for a clutch power shift device comprising a valve housing having openings connected with atmosphere and vacuum, compound valve means reciprocable in the housing for controlling the pressure for the shift device, said valve means including a sleeve having a bleed hole therein, and a choke sleeve in the casing in which the valve sleeve operates, said choke sleeve having relatively large openings in communication with the opening in the valve housing connected with atmosphere, said large openings being adapted to be closed by said valve sleeve only during the latter portion of the clutch engagement movement, said valve means sleeve having restricted passage means continuously in communication with the opening in the valve housing connected with atmosphere.

2. A pressure control mechanism for a clutch power shift device comprising a valve housing having openings communicating with atmosphere and vacuum, a compound valve reciprocable in said housing for regulating the pressure differential for the power shift device, said valve including a sleeve having an air bleed hole therethrough, a choke sleeve in the housing surrounding the end of the valve sleeve, and spring means seating said choke sleeve against an end of the housing, said choke sleeve having air openings communicating with the air opening in the housing and adapted to be closed by said valve sleeve during the latter portion of the clutch engaging operation and having a groove connecting the valve sleeve bleed hole with the air opening in the housing when the choke sleeve air openings are closed.

3. A pressure control device for a clutch power shift mechanism comprising a valve housing having an air inlet and a connection with vacuum, an end wall structure adjustably attached to the housing, a compound valve reciprocable in the housing for controlling pressure at the power shift mechanism, said compound valve including a sleeve having an open end adjacent the adjustable wall, a choke sleeve in the housing in which the open end of the valve sleeve reciprocates, spring means holding said choke sleeve seated against the adjustable end wall structure of said housing, said choke sleeve having openings therein open to the air opening in the casing adapted to be shut off by said valve sleeve while moving toward the adjustable end wall structure of the housing, the adjustment of said housing end wall structure controlling the time in the clutch engagement valve operation at which the air flow through the choke sleeve opening is cut off by the valve sleeve, and restricted air bleed means between the housing air opening and the interior of the valve sleeve effective when the choke sleeve openings are cut off.

4. Clutch shifting mechanism for motor vehicles comprising throttle control mechanism for a motor fuel intake system, a pressure operated shift device, a reciprocable valve device operated in conjunction with the vehicle throttle control mechanism to regulate pressure application to the pressure device, said device in its full clutch engaging stroke allowing initial rapid pressure rise and later a slower pressure rise, and adjustable means for regulating the junction point of the two pressure effects in the stroke of the valve device.

5. A pressure control device for a clutch power shift mechanism comprising a valve housing, an adjustable end plug screwed into the housing, lock means carried by the housing and engaging said plug to secure it in adjusted position, said housing having an air opening adjacent the plug and a connection with a source of vacuum, a choke sleeve in the housing having air ports therethrough in open communication with the housing air opening, a gasket adjacent the inner face of the plug, a spring seated in the housing pressing said choke sleeve against the gasket, and a compound valve structure in the housing including a sleeve having an open end slidable in said choke sleeve, said valve sleeve having a restricted air bleed open to the air opening in the housing and closing the air ports in the choke sleeve during the extended portion of its stroke, the air bleeding to said power shift mechanism while said choke sleeve ports are closed passing through the restriction in the valve sleeve, the adjustment of said plug controlling the position of the choke sleeve air ports relative to the stroke of said valve sleeve.

6. A pressure control device for a clutch power shift mechanism comprising a valve housing, an adjustable end plug screwed into the housing, said housing having an air opening adjacent the plug and a connection with a source of vacuum, a choke sleeve in the housing having air ports therethrough in open communication with the housing air opening, a gasket adjacent the inner face of the plug, a spring seated in the housing pressing said choke sleeve against the gasket, and a compound valve structure in the housing including a sleeve having an open end slidable in said choke sleeve, said valve sleeve having a restricted air bleed open to the air opening in the housing and closing the air ports in the choke sleeve during the extended portion of its stroke, the air bleeding to said power shift mechanism while said choke sleeve ports are closed passing through the restriction in the valve sleeve, the adjustment of said plug controlling the position of the choke sleeve air ports relative to the stroke of said valve sleeve.

7. A pressure control device for a clutch power shift mechanism comprising a valve housing open to atmosphere and vacuum, an adjustable end plug screwed into the housing having a two-diameter axial opening therethrough, a compound valve in said housing regulating the pressure at the power shift mechanism, said compound valve including a manually operable rod extending through the opening in the plug, and an oil treated leather gasket seated in the larger diameter portion of the plug opening, said gasket engaging the valve rod and plug to seal the opening.

8. In a motor vehicle, change speed gearing shiftable to establish a plurality of forward speed drives including a second speed drive, engine throttle control mechanism, drive clutch shifting mechanism operable to release the clutch when subjected to vacuum, means operable in conjunction with said throttle control mechanism to control pressure application to said clutch shifting mechanism, and automatic means operable when the change speed gearing is in second speed forward drive and above a predetermined vehicle speed to delay the normal pressure application rate on the clutch shifting mechanism during clutch engaging movement.

9. In a motor vehicle, change speed gearing shiftable to establish a plurality of forward speed drives including a second speed drive, engine throttle control mechanism, drive clutch shifting mechanism operable to release the clutch when subjected to vacuum, means operable in conjunction with said throttle control mechanism to control pressure application to said clutch shifting mechanism and automatic means including an electric system and a governor operable when the change speed gearing is in second speed forward drive and above a predetermined vehicle speed to delay the normal pressure application rate on the clutch shifting mechanism during clutch engaging movement.

10. In a motor vehicle, change speed gearing shiftable to establish a plurality of forward speed drives including a second speed drive, engine throttle control mechanism, drive clutch shifting mechanism operable to release the clutch when subjected to vacuum and operable to allow engagement of the clutch when subjected to atmosphere, means operable in conjunction with said throttle control mechanism to control the application of vacuum or atmospheric pressure to said clutch shifting mechanism, and a choke valve for controlling the application of atmosphere to said shifting mechanism when the change speed gearing is in second speed forward drive and above a predetermined vehicle speed to delay the normal clutch engaging movement.

11. In a motor vehicle, change speed gearing shiftable to establish a plurality of forward speed drives including a second speed drive, engine throttle control mechanism, drive clutch shifting mechanism operable to release the clutch, engine vacuum means, atmospheric means, a master valve for controlling the application of atmospheric pressure or vacuum on said clutch shifting mechanism, a spring opened throttle valve in the atmospheric pressure means, a solenoid adapted to close said spring opened valve in the atmospheric pressure supply means when the change speed gearing is in second speed forward drive and above a predetermined vehicle speed, and means operable in conjunction with said throttle control mechanism to control said master valve.

12. In a motor vehicle, change speed gearing shiftable to establish a plurality of forward speed drives including a second speed drive, engine throttle control mechanism, drive clutch shifting mechanism operable to release the clutch when subjected to vacuum and to engage the clutch when subjected to atmospheric pressure, a source of atmosphere, a vacuum connection with the vehicle engine, a master valve for controlling atmospheric pressure and vacuum supplied to said clutch shifting mechanism, means connecting said engine throttle control mechanism with said master valve whereby the valve is operated in conjunction with the throttle control mechanism, a choke valve controlling the supply of atmosphere, a solenoid for moving said choke valve to air choking position, an electric system including a switch closed by the change speed drive mechanism when in second speed drive for connecting the electric system with the solenoid for energizing the same, and a governor switch in the electric system operable in response to vehicle speed and in series with said change speed mechanism switch whereby air flowing to said clutch shifting mechanism is choked when the change speed mechanism is operating in second gear below the governed speed.

13. In a vehicle, mechanism for actuating an engine throttle valve and a power clutch control valve comprising a bell crank pivotally mounted adjacent the clutch control valve, a connection between the bell crank and the throttle valve, a spring associated with the bell crank urging it toward throttle valve closing position, a lever pivotally connected to said bell crank and movable a limited amount relative thereto, a connection between said lever and the clutch control valve, an actuator mechanism connected to said lever, and means urging said lever and bell crank into one extreme position of their relative movement.

14. In a vehicle, mechanism for actuating an engine throttle valve and a power clutch control valve comprising a bell crank pivotally mounted adjacent the clutch control valve, a connection between the bell crank and the throttle valve, a spring associated with the bell crank urging it toward throttle valve closing position, a lever pivotally connected to said bell crank and movable a limited amount relative thereto, a connection between said lever and the clutch control valve, an actuator mechanism connected to said lever, and a spring urging said lever and bell crank into one extreme position of their relative movement.

15. In a vehicle, mechanism for actuating an engine throttle valve and a power clutch control valve comprising a bell crank pivotally mounted adjacent the clutch control valve, a connection between the bell crank and the throttle valve, a spring normally urging the bell crank into position closing the throttle valve, a lever pivotally connected to said bell crank and movable a limited amount relative thereto, a connection between said lever and the clutch control valve, an accelerator pedal connected to operate said lever, means for limiting the movement of said bell crank when said accelerator pedal is released, and a spring for urging said lever ahead of said bell crank as a unitary structure when said accelerator pedal is released.

16. In a vehicle, mechanism for actuating an engine throttle valve and power clutch control valve comprising a bell crank pivotally mounted adjacent the clutch control valve, a connection between the bell crank and the throttle valve, a spring engaging the bell crank and urging it toward throttle closing position, a lever pivotally connected to said bell crank and movable a limited amount relative thereto, adjustable means on said bell crank for regulating the relative movement between the lever and the bell crank, a connection between said lever and the clutch control valve, an actuator mechanism connected to said lever, and means acting between said bell crank and said lever to urge said lever ahead of said bell crank in one direction of their relative movement.

17. In a vehicle, mechanism for actuating an engine throttle valve and a power clutch control valve comprising a bell crank pivotally mounted adjacent the clutch control valve, a connection between the bell crank and the throttle valve, spring means engaging said connection to normally urge the throttle valve toward closing position, a lever pivotally connected to said bell crank and movable a limited amount relative thereto, a connection between said lever and the clutch control valve, accelerator pedal operated mechanism connected to rock said lever, abutment means limiting the relative pivotal movement between said lever and bell crank, and a spring engaging said bell crank and said lever to normally urge them apart, said spring resisting relative movement of said lever and bell crank when the accelerator pedal is released and the spring is urging the throttle valve toward closed position whereby said clutch control valve will be immediately moved to cause the clutch to disengage when the accelerator pedal is released.

18. In a clutch control mechanism for a motor vehicle drive having shiftable gearing for establishing several driving speeds, a pressure responsive clutch shifting mechanism, a pressure conduit leading to the shifting mechanism, a valve housing communicating with the pressure conduit, an atmospheric connection leading to said housing, an engine vacuum connection leading to said housing, a valve in said housing operable to control pressure in the pressure conduit, said clutch shifting mechanism being responsive to vacuum to disengage the clutch and to atmospheric pressure to engage the clutch, throttle valve control mechanism, an operative connection from said throttle valve control mechanism to said valve in the housing, a control valve in the vacuum connection, an electromagnetic system controlling said vacuum control valve, means for controlling said system to open said vacuum control valve except when the shiftable gearing is in high speed drive, and another means for controlling said system operable in response to vehicle speed and to engine vacuum conditions whereby said vacuum control valve is open when the throttle control mechanism is in idling position and closed under all other throttle conditions.

19. In a clutch control mechanism for a motor vehicle drive having shiftable gearing for establishing several driving speeds, a pressure responsive clutch shifting mechanism, a pressure conduit leading to the shifting mechanism, a valve housing communicating with the pressure conduit, an atmospheric connection leading to said housing, an engine vacuum connection leading to said housing, a valve in said housing operable to control pressure in the pressure conduit, said clutch shifting mechanism being responsive to vacuum to disengage the clutch and to atmospheric pressure to engage the clutch, throttle valve control mechanism, an operative connection from said throttle valve control mechanism to said valve in the housing, a control valve in the vacuum connection, an electromagnetic system controlling said vacuum control valve, means for controlling said system to open said vacuum control valve except when the shiftable gearing is in high speed drive, and another means for controlling said system including a switch responsive to vehicle speed and a switch responsive to engine vacuum conditions whereby said vacuum control valve is open when the throttle control mechanism is in idling position and closed under all other throttle conditions.

20. In a clutch control mechanism for a motor vehicle drive having shiftable gearing for establishing several driving speeds, a pressure responsive clutch shifting mechanism, a pressure conduit leading to the shifting mechanism, a valve housing communicating with the pressure conduit, an atmospheric connection leading to said housing, an engine vacuum connection leading to said housing, a valve in said housing operable to control pressure in the pressure conduit, said clutch shifting mechanism being responsive to vacuum to disengage the clutch and to atmospheric pressure to engage the clutch, throttle valve control mechanism, an operative connection from said throttle valve control mechanism to said valve in the housing, a control valve in the vacuum connection, an electromagnetic system controlling said vacuum control valve, means for controlling said system to open said vacuum control valve except when the shiftable gearing is in high speed drive, and another means for controlling said system including a vehicle speed responsive switch and an engine vacuum responsive switch in series whereby said vacuum control valve is open when the throttle control mechanism is in idling position and closed under all other throttle conditions.

CLYDE R. PATON.